United States Patent [19]
Cameron

[11] 3,945,591
[45] Mar. 23, 1976

[54] HOT AIR BALLOONS
[75] Inventor: Donald Allan Cameron, Bristol, England
[73] Assignee: Cameron Balloons Limited, Bristol, England
[22] Filed: Nov. 18, 1974
[21] Appl. No.: 524,896

[30] Foreign Application Priority Data
Dec. 10, 1973 United Kingdom............... 57222/73

[52] U.S. Cl.................................... 244/98; 244/31
[51] Int. Cl.².......................................... B64B 1/58
[58] Field of Search.............. 244/96, 97, 98, 31, 33

[56] References Cited
UNITED STATES PATENTS

| | | | |
|---|---|---|---|
| 1,286,579 | 12/1918 | Gammeter | 244/97 |
| 1,866,079 | 7/1932 | Blondin | 244/99 X |
| 3,080,138 | 3/1963 | Church | 244/31 |
| 3,096,048 | 7/1963 | Yost | 244/97 X |
| 3,120,932 | 2/1964 | Stahmer | 244/31 X |
| 3,153,878 | 10/1964 | Smith | 244/31 X |

Primary Examiner—Trygve M. Blix
Assistant Examiner—Galen L. Barefoot
Attorney, Agent, or Firm—Stevens, Davis, Miller & Mosher

[57] ABSTRACT

A hot air balloon of conventional construction with a balloon envelope having an inlet aperture for hot air received from a heat generating device coupled with the envelope and directed into the aperture is provided with a hood coupled with the envelope adjacent the aperture. The hood extends part way round the aperture and is of scoop form extending outwardly from the aperture and partially around the heat generating device and serves to direct wind and hot air into the aperture to facilitate inflation when the scoop is directed windwardly.

4 Claims, 1 Drawing Figure

U.S. Patent  March 23, 1976  3,945,591
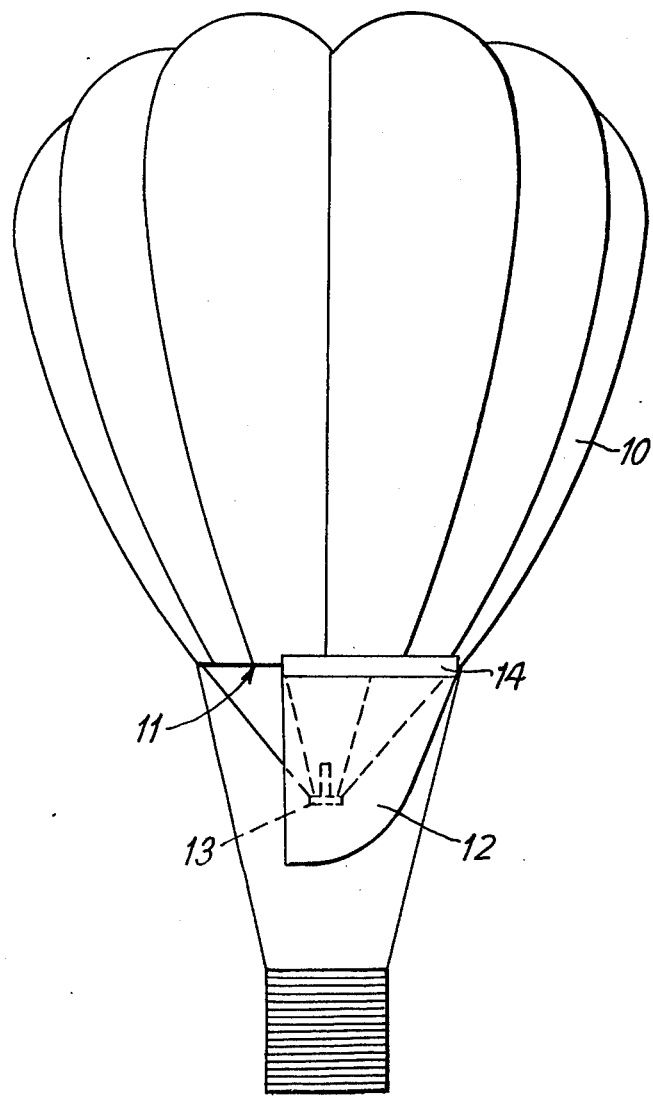

HOT AIR BALLOONS

BACKGROUND OF THE INVENTION

This invention relates to hot air balloons.

The normal method of inflating a hot air balloon involves first laying the balloon out on the ground with its bottom aperture facing towards the wind, and the basket lying on its side. The gas burner is directed horizontally into the aperture, which is held open during this operation. As the balloon inflates, the top or peak attempts to rise, and is held down as long as possible. Once the balloon must be allowed to raise itself, it becomes more difficult to direct the air into the open aperture, while on the other hand, sufficient hot air may not yet have flowed into the balloon to render it fully stable, particularly if conditions are windy.

SUMMARY OF THE INVENTION

Accordingly, the invention provides a hood coupled with the envelope adjacent the aperture and extending part way therearound, which hood is of scoop form extending outwardly from the aperture and partially around the heat generating means, which hood can act as a scoop when the balloon is partially or fully inflated into its raised position such that wind and hot air can be guided into the aperture of the balloon to facilitate inflation by directing the scoop form windwardly.

BRIEF DESCRIPTION OF THE DRAWING

An embodiment of the invention will now be described by way of example only with reference to the accompanying drawing which shows front elevation of a hot air balloon in an inflated condition.

DESCRIPTION OF THE PREFERRED EMBODIMENT

The drawing illustrates a hot air balloon having an envelope 10 with an aperture 11. An inverted hood or scoop 12, which in this preferred form is detachably mounted by a fastening 14, is provided to hang from the edge of the aperture 11. This scoop 12 extends around approximately 240° of the circular aperture, although it may cover up to 320° or as little as 130°. Preferably the scoop is large enough to hang at about or just below the level of the gas burner 13.

During inflation with the balloon still horizontal, the hood is allowed to hang loosely around the aperture while hot air is blown in horizontally. Once the balloon has risen to a vertical position, the scoop hangs beneath the balloon and serves to catch the wind or air flow and to divert it upwards into the balloon.

This causes the wind to help fill the balloon and improves the stability and handling of the balloon during the later stages of the inflation process, particularly at a time when the hot gases, while sufficient to raise the balloon, are not yet sufficient to fully inflate it. At that time, there is a danger that a gust of wind might case the balloon to fold inwards and collapse. The scoop also provides an improved performance whilst the balloon is tethered.

The hood or scoop may be left in position during normal flying, in which case it may be useful to provide a vane arrangement to ensure that the balloon flies with the opening of the scoop continually facing the wind. In any event, the hood may be useful to protect the burner flame in flight.

The hood or scoop in its preferred form is removably coupled with the balloon at or near its aperture by any suitable means e.g. by means of a Velcro strip or zip fastener but may of course be permanently attached.

I claim:

1. In a hot air balloon comprising a balloon envelope having an inlet aperture for hot air and a heat generating means coupled with the envelope and adapted to direct hot air into said aperture, the provision of a hood coupled with the envelope adjacent the aperture and extending part way therearound and which hood is of scoop form extending outwardly from the aperture and partially around said heat generating means, whereby the scoop form is directed windwardly, wind and hot air is guided into the aperture to facilitate inflation of the balloon envelope.

2. A hot air balloon according to claim 1, wherein the hood is formed of a fabrics material.

3. A hot air balloon according to claim 2, including fastening means whereby the hood is detachably coupled with the envelope adjacent the aperture.

4. A hot air balloon according to claim 1 wherein the aperture of the balloon envelope is circular and the hood extends therearound by an angle of between 130° and 320°.

* * * * *